(No Model.)
G. S. MACDONALD.
TROUSERS STRETCHER.
No. 480,199. Patented Aug. 2, 1892.
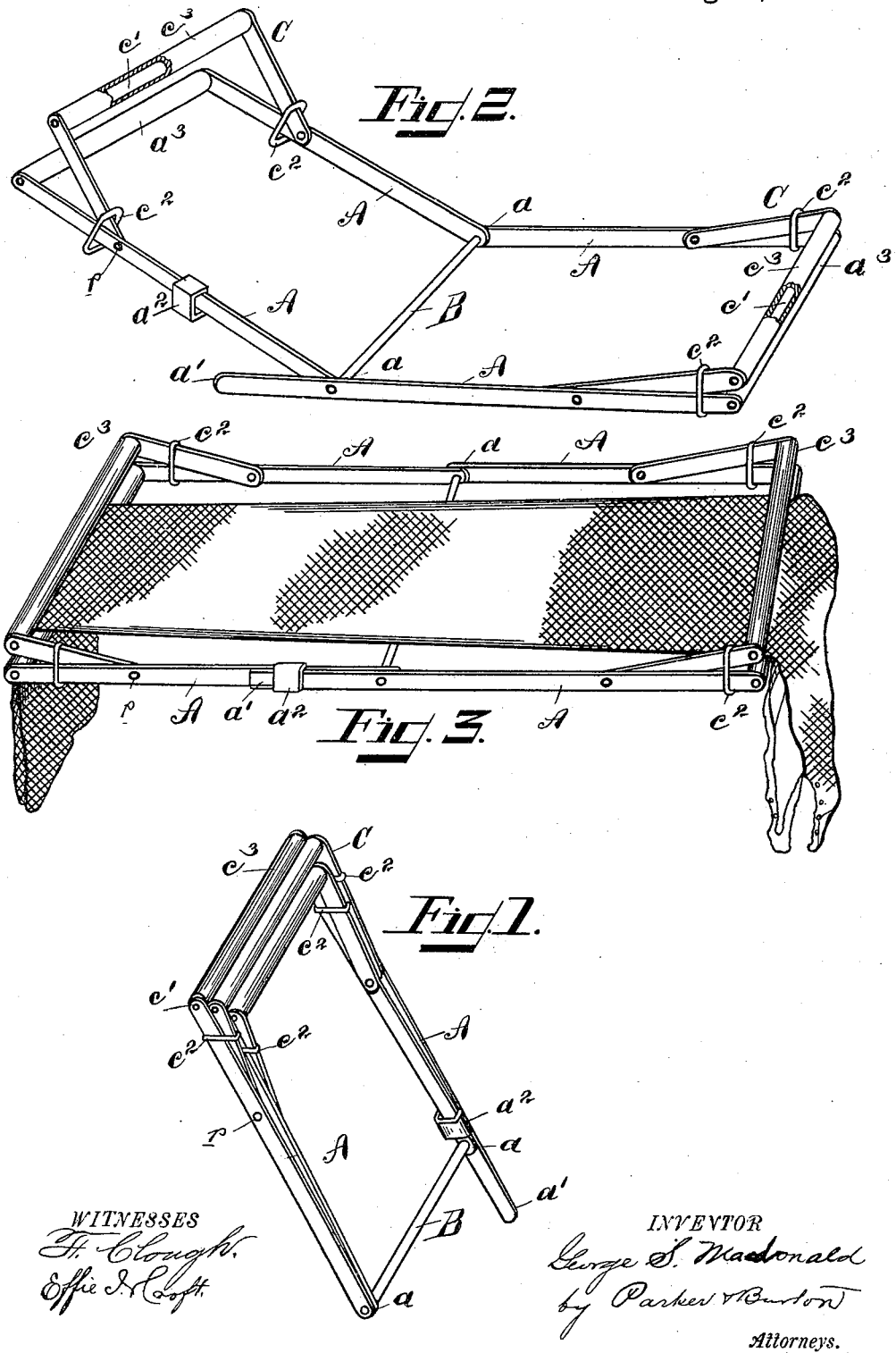
WITNESSES
F. Clough
Effie N. Cooft
INVENTOR
George S. Macdonald
by Parker & Burton
Attorneys.
THE NORRIS PETERS CO., PHOTO-LITHO., WASHINGTON, D. C.

UNITED STATES PATENT OFFICE.

GEORGE S. MACDONALD, OF DETROIT, MICHIGAN, ASSIGNOR, BY DIRECT AND MESNE ASSIGNMENTS, TO THE TROUSERS STRETCHER COMPANY.

TROUSERS-STRETCHER.

SPECIFICATION forming part of Letters Patent No. 480,199, dated August 2, 1892.

Application filed February 12, 1892. Serial No. 421,281. (No model.)

*To all whom it may concern:*

Be it known that I, GEORGE S. MACDONALD, a citizen of the United States, residing at Detroit, county of Wayne, State of Michigan, have invented a certain new and useful Improvement in Trousers-Stretchers; and I declare the following to be a full, clear and exact description of the invention, such as will enable others skilled in the art to which it pertains to make and use the same, reference being had to the accompanying drawings, which form a part of this specification.

My invention relates to an improvement in trousers-stretchers; and its object is to provide a simple and inexpensive device for stretching the leg of the trousers for the purpose of taking out the wrinkles.

In the drawings, Figure 1 is a perspective of the device. Fig. 2 is a perspective of the device open to receive the trousers. Fig. 3 is a view of the device with the trousers in position.

In the drawings, A A are side frames pivoted together on the rod B at $a$. One of these side frames is provided with the extension $a'$, which when the frames lie parallel, as in Fig. 1, extends along the side of the opposite frame. Sliding on the opposite frame is the ring $a^2$, adapted to slide over the extension $a'$ when the frames are in their parallel position and hold the same in that position. Connecting the outer ends of the frames A A are the rods $a^3$. Pivoted to the side frames near the outer end are the auxiliary frames C C, consisting of the short side bars $c$ and the cross-bar $c'$. These frames C C are adapted to swing against the ends of the frames A A and embrace an article placed between the cross-bar $a^3$ and the cross-bar $c'$.

Around each side bar A and the short side bar $c$, adjacent to it and between the pivot $p$ and the cross-bars $a^3 c'$, I place a ring $c^2$, oblong in shape and with a short diameter sufficient to slip easily along the bars A $c$ and with a long diameter about equal to the sum of the widths of the two side bars A $c$. Thus the ring $c^2$ when moved to near the pivot $p$ allows the two frames to be spread apart sufficiently to allow the insertion between the cross-bars $a^3$ and $c'$ of the article to be stretched, and then upon moving the ring $c^2$ toward the cross-bar $a^3$, the two cross-bars are tightly clamped upon the article to be stretched. The ring $c^2$ is prevented from slipping back on the side bar A by the pivot $p$. These rings $c^2$ may be dispensed with and any suitable catch employed to hold the auxiliary frame to the main frame. I provide the cross-rods $a^3$ and $c'$ with a rubber covering $c^3$.

The operation of my device is as follows: The sliding collar $a^2$ is slid along on the side frames until the extension $a'$ is released, when the frames can be doubled up into the position shown in Fig. 2. The auxiliary frames are then swung away from the main frames and the legs of the trousers passed through, one end of the frame embracing the trousers above the knee and the other near the bottom, when the rings $c^2$ are slid toward the end of the side frames, forcing the auxiliary frames toward the main frames and embracing the trousers and locking them between the frames. The stretcher itself is then extended into the horizontal position, as shown in Fig. 3, and the ring $a^2$ slipped into position over the extension $a'$, holding the frame in its parallel position. Any degree of tension can be given to the trousers, according to the position of the stretcher when taking hold of the legs of the trousers. If but a slight tension is to be given them, then the stretcher is engaged with the trousers when the frames are set at an obtuse angle.

To provide for stretching the trousers from the top to the bottom, I make one end of the stretcher wider than the other, the narrow end to grasp the bottom of the trousers, and the wider end the top. I also provide one set of the side frames A A, shorter than the opposite set, so that the stretcher may be folded together, as shown in Fig. 3. In this case the cross-rods at the narrow end of the stretcher swing inside of the cross-rods at the opposite end. This adapts the stretcher to be packed into a small space, and it may be conveniently carried in an ordinary hand-bag.

What I claim is—

In a trousers-stretcher, the combination, with two frames composed, respectively, of side bars and end bars, one frame being of smaller dimensions than the other, a cross-rod pivotally uniting the inner ends of the side bars, locking means for retaining the frames in a parallel position, frames pivoted to the outer ends of the side bars, carrying cross-bars parallel with the cross-bars of the main frame, means for holding the cross-bars together, and a rubber covering on the cross-bars, substantially as described.

In testimony whereof I sign this specification in the presence of two witnesses.

GEORGE S. MACDONALD.

Witnesses:
C. H. FISK,
MARION A. REEVE.